(12) United States Patent
Lee et al.

(10) Patent No.: US 9,365,427 B2
(45) Date of Patent: Jun. 14, 2016

(54) METHOD FOR PURIFYING CARBON NANOTUBES

(71) Applicant: Industry-Academia Cooperation Group Of Sejong University, Seoul (KR)

(72) Inventors: Nae Sung Lee, Seoul (KR); Jeung Choon Goak, Seoul (KR); Chang Jin Lim, Seoul (KR); Eun Kyung Cho, Daejeon (KR)

(73) Assignee: INDUSTRY-ACADEMIA COOPERATION GROUP OF SEJONG UNIV, Seoul (KR)

( * ) Notice: Subject to any disclaimer, the term of this patent is extended or adjusted under 35 U.S.C. 154(b) by 0 days.

(21) Appl. No.: 14/586,651

(22) Filed: Dec. 30, 2014

(65) Prior Publication Data
US 2015/0251910 A1    Sep. 10, 2015

(30) Foreign Application Priority Data

Mar. 7, 2014    (KR) .................. 10-2014-0027208
Dec. 15, 2014    (KR) .................. 10-2014-0180206

(51) Int. Cl.
*C01B 31/02*    (2006.01)
*B82Y 40/00*    (2011.01)

(52) U.S. Cl.
CPC .............. *C01B 31/026* (2013.01); *B82Y 40/00* (2013.01); *Y10S 977/845* (2013.01)

(58) Field of Classification Search
CPC .............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04

USPC .................. 423/447.1–447.3, 445 B, 461
See application file for complete search history.

(56) References Cited

U.S. PATENT DOCUMENTS 7,807,127 B1 * 10/2010 Forohar .............. B82Y 10/00
                                                                423/447.1
2002/0159944 A1 * 10/2002 Smalley ............ B82Y 30/00
                                                                423/447.6

(Continued)

FOREIGN PATENT DOCUMENTS

EP        1061040 A1    12/2000
JP    2006-306636 A    11/2006

(Continued)

OTHER PUBLICATIONS

Matheson, et al., Reductive Dehalogenation of Chlorinated Methanes by Iron Metal, Environ. Sci. Technol. 1994; 28: 2045-2053.*

(Continued)

*Primary Examiner* — Daniel C McCracken
(74) *Attorney, Agent, or Firm* — Knobbe Martens Olson & Bear LLP

(57) ABSTRACT

A method for purifying carbon nanotubes (CNTs) includes heating the CNTs including metallic impurities and metallic oxide impurities; reducing the metallic oxide impurities by passing a reducing gas through the CNTs; removing the metallic impurities and the reduced metallic oxide impurities by passing a liquid halide through the CNTs using a carrier gas; and cooling the CNTs. Therefore, by simply passing liquid chloroform through CNTs using a carrier gas, a method for purifying CNTs can be provided so as to simply, economically, and effectively remove metallic impurities from the CNTs in a short time through one step. In addition, the purification effect can be further improved by removing the metallic oxide impurities as well as the metallic impurities through the reducing step. In addition, it is possible to improve the purification effect by further performing a step of removing a halogen or an acid-treatment purification step.

22 Claims, 10 Drawing Sheets

(56) References Cited

U.S. PATENT DOCUMENTS

2010/0119436 A1     5/2010    Takimoto et al.
2012/0082594 A1     4/2012    Han et al.

FOREIGN PATENT DOCUMENTS

| | | |
|---|---|---|
| KR | 10-2001-0066815 A | 7/2001 |
| KR | 10-0790839 B1 | 1/2008 |
| KR | 10-2010-0036572 A | 4/2010 |
| WO | 2008/126534 A1 | 10/2008 |

OTHER PUBLICATIONS

H. Ramsey Fowler and Jane E. Aaron, The Little, Brown Handbook, p. 307 (11th Edition, 2010 Pearson Education, Inc.).*

Mercier et al., "Selective removal of metal impurities from single walled carbon nanotube samples", New J. Chem., 2013, vol. 37, pp. 790-795.

Office Action dated Jun. 23, 2015 of corresponding Korean Patent Application No. KR 10-2014-0180206—5 pages.

* cited by examiner

Ch : Chloroform,800°C,Treating for 15 min
Ar : 11M Hydrochloric acid,130°C,reflux,3Hours
As : 11M Hydrochloric acid,Room temperature stirring,3Hours
3As : 3M Hydrochloric acid,Room temperature stirring,3Hours

METHOD FOR PURIFYING CARBON NANOTUBES

CROSS-REFERENCE TO RELATED APPLICATION

This application claims priority to and the benefit of Korean Patent Application No. 10-2014-0027208, filed on Mar. 7, 2014 and No. 10-2014-0180206, filed on Dec. 15, 2014, the disclosure of which is incorporated herein by reference in their entirety.

BACKGROUND

1. Field

The present disclosure relates to a method for purifying carbon nanotubes (CNTs), and more particularly, to a method for purifying CNTs that includes removing metallic impurities and metallic oxide impurities that are included in the CNTs using a reducing gas and a liquid halide.

2. Discussion of Related Art

Carbon nanotubes (CNTs) are expected to be variously applied to modern industrial fields based on their current excellent properties, such as mechanical strength, chemical stability, thermal conductivity, and electrical conductivity.

Meanwhile, in pristine CNTs, there are carbon impurities, such as fullerenes and amorphous carbon, and metallic impurities that are used as catalysts in synthesis.

SUMMARY

The present disclosure is directed to a simple, economical and safe purification method for removing metallic impurities or metallic oxide impurities from carbon nanotubes (CNTs) that exhibits an excellent purification effect.

One aspect of the present invention provides a method for purifying CNTs. The method for purifying CNTs may include heating CNTs including metallic impurities and metallic oxide impurities, reducing the metallic oxide impurities by passing a reducing gas through the CNTs, removing the metallic impurities and the reduced metallic oxide impurities by passing a liquid halide through the CNTs using a carrier gas, and cooling the CNTs.

The metallic impurities may include Fe, Co, Ni, or Al.

The metallic oxide may include $Al_2O_3$ or MgO.

The reducing gas may include $H_2$.

The halide may include chloroform.

The carrier gas may include $N_2$ or Ar.

The reducing step and purifying step may be alternately and repeatedly performed at least one or more times.

The step of heating the CNTs may be performed at the temperature of 650° C. to 800° C.

The step of removing a halogen remaining in the CNTs may be further included during the purifying step between the purifying step and the step of cooling the CNTs.

The step of removing the halogen may be performed by etching the surface of the CNTs.

The step of removing the halogen may include a nitrogen treatment, an oxygen treatment, a hydrogen treatment, or a water moisture treatment.

The step of removing the halogen may be performed by coating the surface of the CNTs with a carbon material, burying the halogen underneath the surface of CNTs, and then, removing the halogen from the surface of the CNTs.

The step of removing the halogen may be performed by injecting a hydrocarbon gas to the CNTs and then, thermally decomposing the hydrocarbon gas for coating a thin carbon layer on the CNTs.

The injection of the hydrocarbon gas may be performed by bubbling an organic solvent including carbon and hydrogen with a carrier gas, and then, injecting the gas to the CNTs.

After the step of cooling the CNTs, the step of treating the CNTs with an acid may be further included.

The step of treating the CNTs with an acid may be performed by treating a hydrochloric acid.

The step of treating the CNTs with an acid may be performed at room temperature.

Another aspect of the present invention provides a method for purifying CNTs. Such a method for purifying CNTs may include heating CNTs including metallic impurities, removing the metallic impurities by passing liquid chloroform through the CNTs using a carrier gas, and cooling the CNTs.

The metallic impurities may include Fe, Co, Ni, or Al.

The step of removing halogen remaining in the CNTs may be further included during the purifying step between the step of removing the metallic impurities and the step of cooling the CNTs.

The step of removing the halogen may be performed by injecting an etching gas or hydrocarbon deposition gas to the CNTs.

After the step of cooling the CNTs, the step of treating the CNTs with an acid may be further included.

BRIEF DESCRIPTION OF THE DRAWINGS

The above and other features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
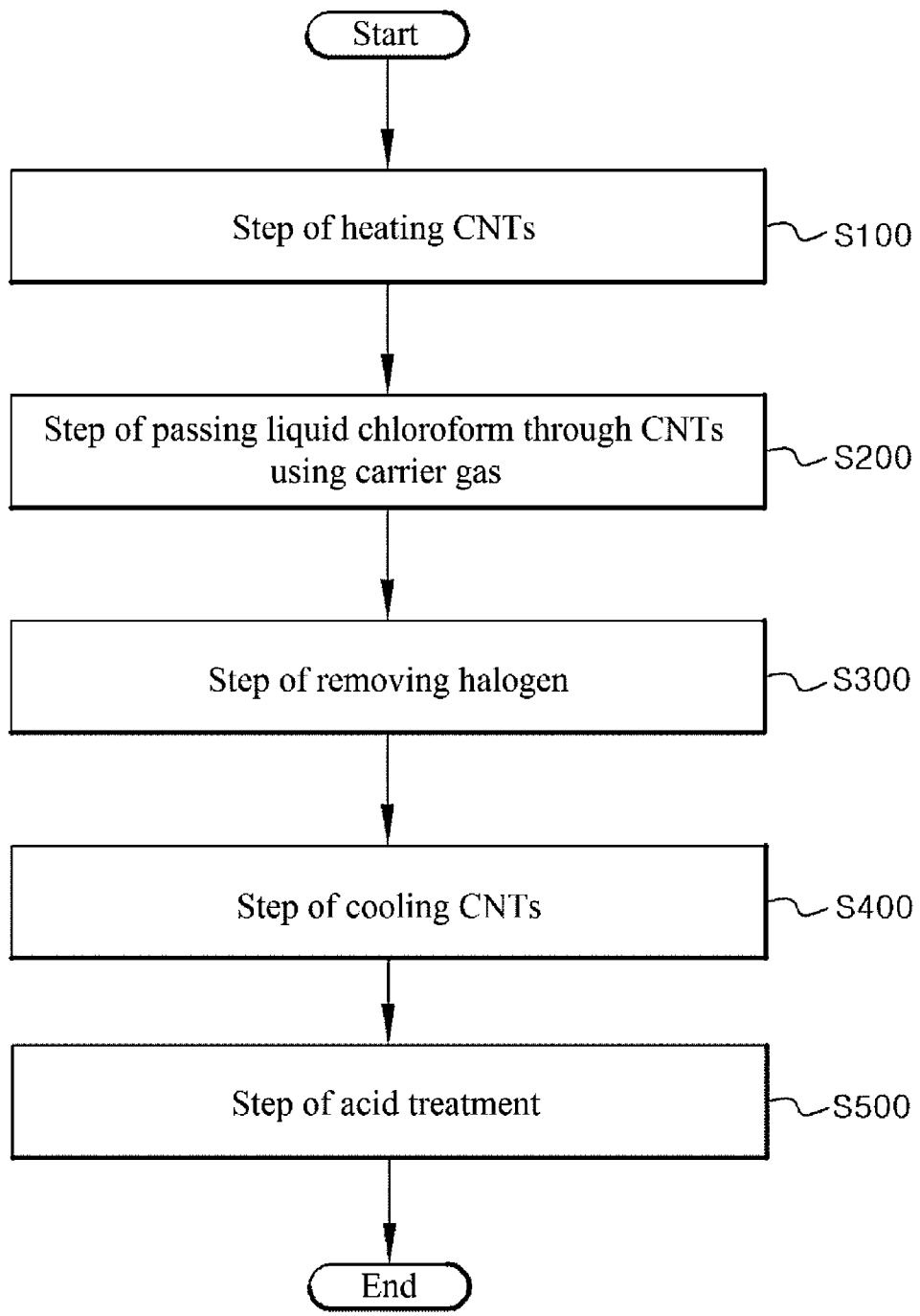
FIG. 1 is a flow chart illustrating a method for purifying carbon nanotubes (CNTs) according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention includes various modifications and variations, and specific examples thereof are exemplified and will hereinafter be described in detail. However, the present invention should not be considered to be limited to the described specific types, and the present invention includes all of the modifications equivalents, and substitutions consistent with the scope of the present invention defined by the claims.

When it is described that elements, such as, a layer, an area, or a substrate, are "on" other elements, it should be understood that the elements may be directly on the other elements or there may be intervening elements.

Although terms such as "first" and "second" may be used to explain various elements, components, areas, layers, and/or regions, the elements, components, areas, layers, and/or regions should not be understood to be limited by these terms.

Generally, among the impurities that are included in CNTs, it is relatively easy to remove carbon impurities through heat treatment under an oxidative atmosphere. However, metallic impurities are surrounded with graphitic carbon layers that is thermally and chemically stable, and thus oxidative chemicals do not easily penetrate to graphitic carbon layers. Therefore, it is difficult to remove the metallic impurities.

When CNTs include metallic impurities thermal stability of the material can be reduced in industrial applications, which decreases the performance of a lithium-ion battery. In addition, CNTs have toxicity, and thus, when CNTs are used for medical uses, it may be harmful to the human body. Therefore, these problems remain the biggest obstacle in applying CNTs including metallic impurities for higher value-added applications.

Therefore, metallic impurities should be removed, and a purification technology for effectively removing them is needed.

Up to now, purification methods for removing metals to manufacture high-purity CNTs have been studied, and representatively, include a liquid purification method, a microwave method, a vacuum purification method, and the like.

However, these purification methods for removing metals have disadvantages in that the processes are complex, the cost of apparatuses is high, and the purification takes much time.

Therefore, studies on economical and safe metal purification methods for removing metals from CNTs that exhibit an excellent purification effect are needed.

Meanwhile, when CNTs are grown using a catalyst prepared by dispersing Fe, Co, and Ni on the $Al_2O_3$ support, the CNTs may include metallic oxide impurities of ceramics, such as, $Al_2O_3$, in addition to metallic impurities. Since $Al_2O_3$ is stable even at high temperatures of 2,000° C. or higher and thus is not decomposed, studies on removing the metallic oxide impurities are also needed.

FIG. 1 is a flow chart illustrating a method for purifying carbon nanotubes (CNTs) according to an embodiment of the present invention.

Referring to FIG. 1, the method for purifying CNTs according to an embodiment of the present invention may include heating CNTs (S100), passing liquid chloroform ($CHCl_3$) through the CNTs using a carrier gas (S200), removing a halogen (S300), and cooling the CNTs (S400). In addition, a step of treating the CNTs with an acid (S500) may be further included after the step of cooling the CNTs (S400).

For the step of heating the CNTs (S100), the CNTs may include metallic impurities. For example, at this time, the metallic impurities may include Fe, Co, Ni, or Al.

For example, the CNTs may be synthesized using chemical vapor deposition (CVD). For example, as a CVD method for synthesizing a large quantity of multi-walled CNTs (MWCNTs), the CNTs may be grown using the catalyst prepared by supporting Fe, Co, or Ni using $Al_2O_3$ as a support.

Therefore, when using such a CNT preparation method, metallic impurities such as, Fe, Co, Ni, or Al may remain after the CNT preparation.

The step of heating the CNTs (S100) is performed to perform a thermal decomposition reaction of chloroform gas and generation and sublimation of metallic chloride impurities in the step of purifying the CNTs (S200).

For example, the CNTs including metallic impurities may be added in a furnace, and then heated.

The step of heating the CNTs may be performed by heating CNTs up to a purification temperature of 650° C. to 800° C.

When the purification temperature of the CNTs is less than 650° C., there is a problem in that it is difficult to supply enough energy to perform the thermal decomposition reaction of chloroform gas in the step of removing metallic impurities as will be described below.

In addition, when the purification temperature of the CNTs exceeds 800° C., there is no increase in the purification effect, and thereby, economic efficiency may be reduced.

Next, the step of passing liquid chloroform through the CNTs using a carrier gas (S200) is a purification step for removing metallic impurities included in the CNTs.

At this time, the carrier gas may include nitrogen ($N_2$) or argon (Ar) gas.

While the chloroform delivered by the carrier gas passes through the heated CNTs, the thermal decomposition reaction occurs, and thus a Cl radical and HCl gas generated by the thermal decomposition reaction react with the metallic impurities included in CNTs to generate metallic chloride impurities. The metallic chloride impurities thus generated are mostly sublimated, and thus are blown away as a gas.

Therefore, it is possible to remove the metallic impurities included in the CNTs simply through a gas-phase purification method including passing chloroform gas through the CNTs using a carrier gas.

The thermal decomposition reaction of chloroform occurs competitively in three reactions as follows.

$$CHCl_3 \rightarrow :CCl_2 + HCl \qquad \text{[Equation 1a]}$$

$$CHCl_3 \rightarrow CHCl_2 + \cdot Cl \qquad \text{[Equation 1b]}$$

$$CHCl_3 \rightarrow CCl_3 + \cdot H \qquad \text{[Equation 1c]}$$

Here, the reaction of Equation 1a is a main decomposition reaction of chloroform.

In addition, the Cl radical in the three reactions is generated by the reaction of Equation 1b.

The generated Cl radical mainly reacts with metallic impurities, such as Fe, Co, or Al, as in the following Equations 2a to 2d to form metallic chloride impurities.

$$2Cl. + Fe \rightarrow FeCl_2 (g) \quad \text{[Equation 2a]}$$

$$6Cl. + 2Fe \rightarrow 2FeCl_3 (g) \quad \text{[Equation 2b]}$$

$$2Cl. + Co \rightarrow CoCl_2 (g) \quad \text{[Equation 2c]}$$

$$3Cl. + Al \rightarrow AlCl_3 (g) \quad \text{[Equation 2d]}$$

In addition, the HCl gas generated by the reaction of Equation 1a may react with metallic impurities as in the following Equations 3a to 3d to form metallic chloride impurities.

$$2HCl (g) + Fe \rightarrow FeCl_2 (g) + H_2 (g) \quad \text{[Equation 3a]}$$

$$6HCl (g) + 2Fe \rightarrow 2FeCl_3 (g) + 3H_2 (g) \quad \text{[Equation 3b]}$$

$$2HCl + Co \rightarrow CoCl_2 (g) + H_2 (g) \quad \text{[Equation 3c]}$$

$$6HCl + 2Al \rightarrow 2AlCl_3 (g) + 3H_2 (g) \quad \text{[Equation 3d]}$$

As one of the biggest difficulties in typical CNT purification methods, there is a problem in that it is difficult to remove metallic impurities because the metallic impurities are surrounded with graphitic carbon layers, and thus are not exposed to an acid serving as a purification reagent.

Accordingly, a main purpose and object of the typical CNT purification methods are to first remove these carbon layers.

When the gas-phase purification method using liquid chloroform according to embodiments of the present invention is used, the Cl radical and H radical generated through the thermal decomposition reaction of chloroform may attack carbon, and may easily penetrate the gap generated by the attack to come in contact with metallic impurities, thereby generating metallic chloride impurities.

The metallic chloride impurities are bulkier than the metallic impurities, and thus stress is applied to a carbon layer to generate a gap further. Through the gap, the Cl radical may easily penetrate and react with metallic impurities to generate metallic chloride impurities.

In addition, the metallic chloride impurities thus generated may be mostly sublimated, and thus may be blown away as a gas.

Meanwhile, carbon tetrachloride ($CCl_4$), production of which is currently regulated because it is an ozone-layer-depleting substance, includes Cl, such as in chloroform ($CHCl_3$), and the thermal decomposition reaction thereof is as in the following Equation 4a.

$$CCl_4 (g) \rightarrow C + 4Cl. \quad \text{[Equation 4a]}$$

In the decomposition process of the relevant substance, carbon tetrachloride, the Cl radical may be only generated unlike chloroform, and the Cl radical may react with metallic impurities in CNTs to form metallic chloride impurities.

Therefore, when chloroform is used, in addition to the Cl radical, H radical or HCl gas is generated, which is involved in the purification reaction for removing metallic impurities. Therefore, a purification effect may be superior to that of the method for removing metallic impurities using only the Cl radical, such as that of carbon tetrachloride.

Next, in the step of removing the halogen (S300), a halogen, such as Cl, may remain in the CNTs during the purification step (S200) described above. When the Cl that remains and is functionalized in the CNTs during the purification reacts with water at a high temperature, hydrogen chloride is generated, and thus it may corrode metals.

Therefore, by removing the Cl remaining in the CNTs through the step of removing the halogen (S300), it is possible to prevent problems such as corrosion of metals that can be caused later.

The step of removing the halogen (S300) may include removing the halogen by etching the surface of the CNTs. For example, the step of removing the halogen (S300) may include a nitrogen treatment, an oxygen treatment, a hydrogen treatment, or a water moisture treatment.

Meanwhile, in the step of removing the halogen (S300), the halogen remaining on the CNTs is not substantially removed, but the halogen may be removed from the surface of the CNTs by coating a carbon substance on the surface of the CNTs. In other words, in the step of removing the halogen, a carbon layer is coated over the surface of the CNTs to bury the halogen underneath the surface of the CNTs. For example, a hydrocarbon gas may be injected to the CNTs and subjected to a thermal decomposition to coat a carbon layer on the surface of the CNTs. At this time, the injection of the hydrocarbon gas may be performed by bubbling an organic solvent including carbon and hydrogen with a carrier gas. For example, at this time, the organic solvent may be methanol ($CH_3OH$), ethanol ($C_2H_5OH$), propanol ($C_3H_7OH$), toluene ($C_6H_5(CH_3)$), or xylene ($C_6H_4(CH_3)_2$).

Next, in the step of cooling the CNTs (S400), the CNTs that are subjected to a purification process are cooled to obtain the purified CNTs. For example, the CNTs are cooled to room temperature by flowing $N_2$ gas to obtain the purified CNTs.

Meanwhile, other toxic substances such as metallic chloride impurities generated through the step of purifying the CNTs may be collected through a cold trap. In addition, unreacted chloroform or other by-products which may be produced during the purification process, can be collected through a cold trap.

For example, such a cold trap may use an ethanol refrigerant having a temperature of about −40° C.

In addition, the HCl gas generated through the step of purifying the CNTs may be collected through a HCl trap. For example, such a HCl trap may collect HCl gas using an aqueous NaOH solution.

Meanwhile, after the step of cooling the CNTs (S400), the step of treating the CNTs with an acid (S500) may be further performed.

For the acid treatment step (S500), as can be seen from the test results to be described below, Al and Mg partially remain even after chloroform treatment. Therefore, by further removing metallic impurities that partially include Al and Mg through acid treatment after the chloroform treatment step, it is possible to improve purification efficiency. For example, after purifying CNTs using chloroform, the purification treatment may be performed by adding the CNTs in a 3M hydrochloric acid solution and stirring them at room temperature.

When the acid treatment step (S500) is performed as described above, the CNTs that are subjected to an acid treatment (S500) may be filtered and washed.

Figure 2:
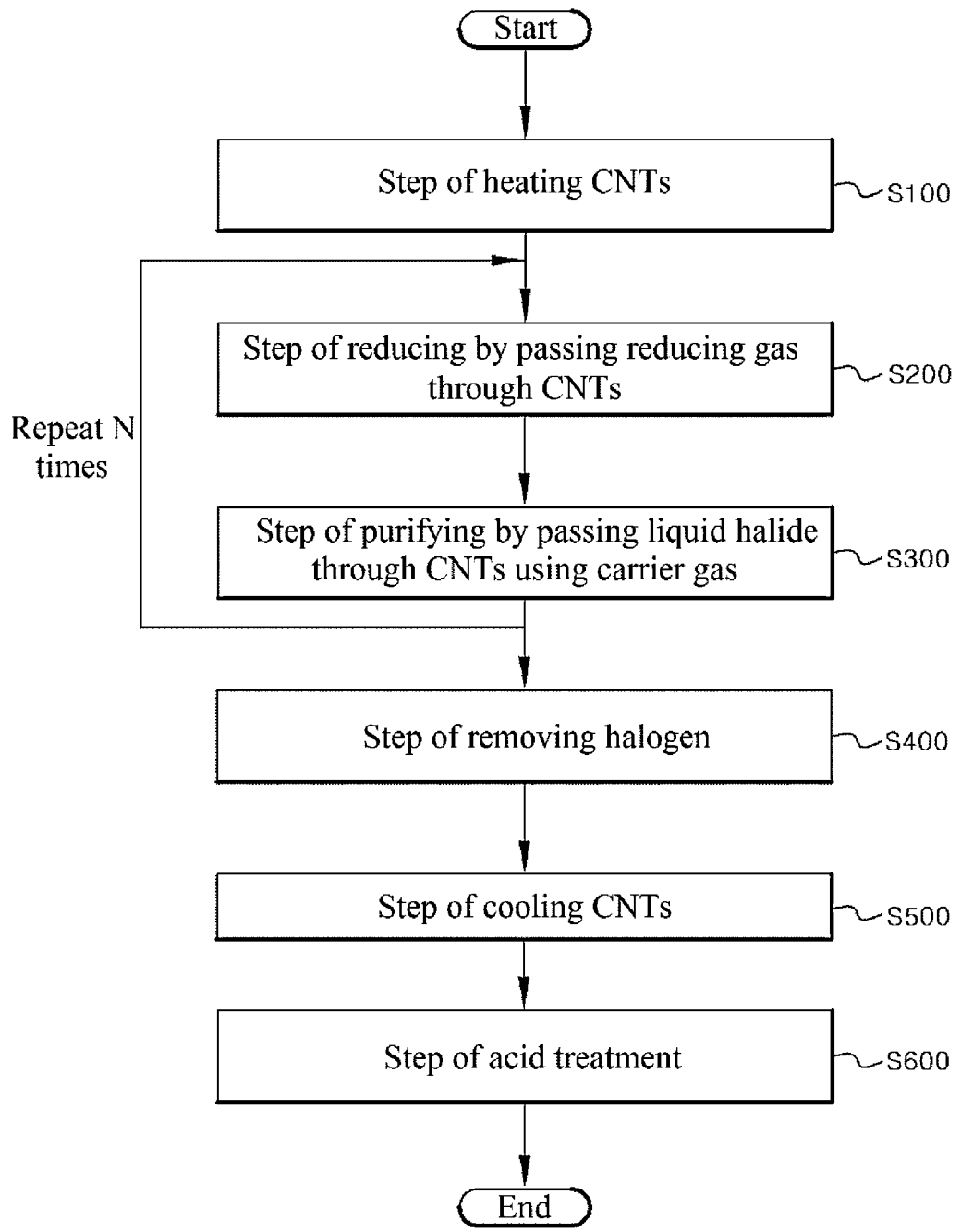
FIG. 2 is a flow chart illustrating a method for purifying CNTs according to another embodiment of the present invention.

FIG. 2 is a flow chart illustrating a method for purifying CNTs according to an embodiment of the present invention.

Referring to FIG. 2, the method for purifying CNTs according to an embodiment of the present invention may include a step of heating the CNTs (S100), a reducing step of passing a reducing gas through the CNTs (S200), a purification step of passing a liquid halide through the CNTs using a carrier gas (S300), a step of removing a halogen that remains in the CNTs (S400), a step of cooling the CNTs (S500), and an acid treatment step (S600).

In the step of heating the CNTs (S100), the CNTs may include metallic impurities and metallic oxide impurities.

For example, at this time, the metallic impurities may include Fe, Co, Ni, or Al. In addition, at this time, the metallic oxide impurities may include $Al_2O_3$ or MgO.

For example, the CNTs may be synthesized using a CVD method. For example, for the CVD method for synthesizing a large quantity of multi-walled CNTs (MWCNT), the CNTs may be grown using the catalyst prepared by supporting Fe, Co, or Ni using $Al_2O_3$ or MgO as a support.

Therefore, when using such a CNT preparation method, the metallic impurities, such as, Fe, Co, Ni, or Al and the metallic oxide impurities, such as, $Al_2O_3$ or MgO, may remain after preparing the CNTs.

The step of heating the CNTs (S100) is a step of increasing temperature of CNTs by heating, prior to a step of performing a thermal decomposition reaction of the halide for the generation or sublimation of the metallic chloride impurities in the purification step (S300) to be described below.

The step of heating the CNTs may be performed by heating the CNTs up to a purification temperature of 650° C. to 800° C.

When the purification temperature of the CNTs is less than 650° C., there is a problem in that it is difficult to supply enough energy to perform the thermal decomposition reaction of the halide in the purification step (S300) to be described below.

In addition, when the purification temperature of the CNTs exceeds 800° C., there is no increase in the purification effect, that is, a saturation state, and thus economic efficiency may be reduced.

Next, the reducing step of passing a reducing gas through the CNTs (S200) reduces metallic oxide impurities included in the CNTs using a reducing gas.

At this time, the reducing gas may include hydrogen ($H_2$) gas. For example, when the metallic oxide impurities are $Al_2O_3$ and the reducing gas is $H_2$, the $Al_2O_3$ may be reduced into Al by the $H_2$ gas. Therefore, the reduced Al may react with Cl radicals, and thus may be removed in the form of $AlCl_3$ (g) in the purification step (S300) to be described below.

Next, the purification step of passing a liquid halide through the CNTs using a carrier gas (S300) may remove the metallic impurities and the reduced metallic oxide impurities included in the CNTs using the delivered halide.

At this time, the halide may include a chloride-based substance. For example, the chloride-based substance may include chloroform.

The liquid halide may be delivered to the CNTs using a carrier gas. At this time, the carrier gas may include nitrogen ($N_2$) or argon (Ar).

For example, by using a bubbling system, the liquid halide may be delivered to the CNTs using a $N_2$ carrier gas.

Meanwhile, the reducing step and the purification step may be repeated n times. In other words, the reducing step and the purification step may be alternately and repeatedly performed at least one or more times. It is preferable to perform the reducing step and the purification step two or more times.

This is because a small amount of the metallic oxide impurities may remain after performing the reducing step and the purification step once.

Therefore, the remaining metallic oxide impurities may be removed by repeatedly performing the reducing step and the purification step on the remaining metallic oxide impurities that remain after the first purification step, and thus the purification efficiency may be further improved.

Next, the halogen that remains in the CNTs through the above described purification step (S300) may be removed (S400). For example, when the halide used in the above-described purification step (S300) is chloroform, the halogen remaining in the CNTs may be Cl.

The halogen, such as Cl, that remains and is functionalized in the CNTs during the purification may cause problems such as metal corrosion later, and thus it is important to remove the halogen.

For example, the step of removing the halogen that remains in the CNTs (S400) may be performed by injecting an etching gas or a hydrocarbon deposition gas to the CNTs.

For example, the etching gas treatment may include a nitrogen treatment, an oxygen treatment, a hydrogen treatment, or a water moisture treatment. In addition, the hydrocarbon deposition gas may be injected to the CNTs by bubbling an organic solvent including carbon and hydrogen with a carrier gas. For example, at this time, the organic solvent may be methanol ($CH_3OH$), ethanol ($C_2H_5OH$), propanol ($C_3H_7OH$), toluene ($C_6H_5(CH_3)$), or xylene ($C_6H_4(CH_3)_2$).

Next, the CNTs may be cooled through the step of cooling CNTs (S500) to obtain the purified CNTs. For example, the CNTs may be cooled to room temperature using $N_2$ gas to obtain the purified CNTs.

Next, the step of treating the CNTs with an acid (S600) may be performed. The step of treating the CNTs with an acid (S600) may include treating the CNTs with a solution including hydrochloric acid, nitric acid, phosphoric acid, sulfuric acid, or sodium hydroxide. For example, the cooled CNTs may be treated with hydrochloric acid at room temperature to further remove the remaining metallic impurities or metallic oxide impurities.

Example 1

0.5 g of MWCNTs A was added to a quartz glass tube (a length of 65 cm and a diameter of 3 cm), the quartz glass tube was fixed in a vertical furnace, and then the furnace was electrically heated from room temperature to a purification temperature under a nitrogen atmosphere.

When the temperature of the furnace reached the purification temperature, the nitrogen gas was passed through liquid chloroform (anhydrous, Aldrich), and served to deliver chloroform as a gas.

At this time, when the chloroform was bubbled at a nitrogen flow rate of 100 ml/min, the chloroform was injected to the CNTs at a flow rate of 0.16 ml/min along with nitrogen as a carrier gas for 1 hour and 10 minutes.

The chloroform was subjected to a thermal decomposition in a high-temperature reactor, and then the metallic impurities included in the CNTs were removed using the Cl radical and HCl gas generated through the thermal decomposition reaction.

After completing the purification process, the furnace was again cooled to room temperature under a nitrogen atmosphere to obtain the purified CNTs ($CHCl_3$ treated sample).

Meanwhile, the unreacted chloroform and the by-products from the purification reaction were collected in a liquid or solid form using a cold trap, and the HCl gas that was one of the products was collected through a trap including a 1M aqueous NaOH solution.

Example 2

0.5 g of MWCNTs A was added to a quartz glass tube (a length of 65 cm and a diameter of 3 cm), the quartz glass tube was fixed in a vertical furnace, and then the furnace was increased from room temperature to a purification temperature under a nitrogen atmosphere.

When the temperature of the furnace reached the purification temperature, the reducing step of passing the mixed gas (hereinafter referred to as $H_2$ (5%)) of 95% nitrogen and 5% hydrogen through the CNTs for 1 hour was performed.

Next, the nitrogen gas, a carrier gas, was passed through liquid chloroform (anhydrous, Aldrich) at a flow rate of 100 ml/min, and the purification step of injecting the chloroform along with nitrogen, a carrier gas, to the CNTs at a flow rate of 0.16 ml/min was performed for 1 hour.

The reducing step was performed for 10 minutes once more to reduce the remaining $Al_2O_3$, and then the purification step was again performed for 10 minutes to purify the CNTs.

In other words, the CNT purification process was performed through steps using $H_2$ (5%)/$CHCl_3$/$H_2$ (5%)/$CHCl_3$.

Figure 3:
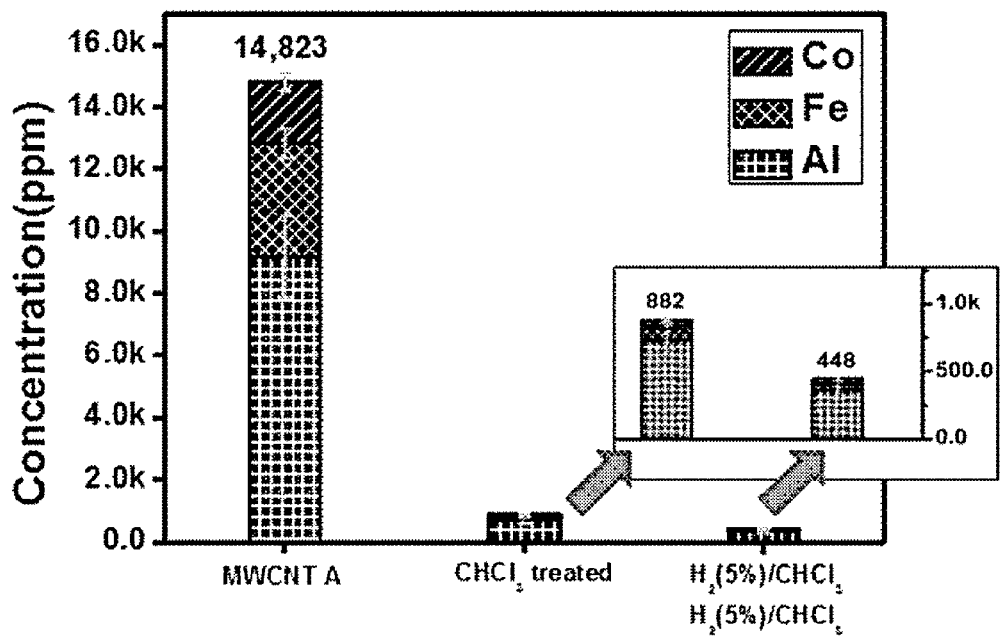
FIG. 3 is a graph illustrating the concentrations of metallic impurities in the CNTs after performing the purification steps of Examples 1 and 2.

FIG. 3 is a graph illustrating the concentrations of metallic impurities in the CNTs after performing the purification steps of Examples 1 and 2. At this time, the analysis of the impurity concentration was performed through inductively coupled plasma atomic emission spectroscopy (ICP-AES).

Referring to FIG. 3, for the MWCNT A, raw CNTs that were not subjected to the purification method, a total concentration (Al+Fe+Co) of metallic impurities was 14,823 ppm.

In addition, for the $CHCl_3$-treated CNTs that on which the purification method of Example 1 was performed, the total concentration was 882 ppm, indicating that the metallic impurities were reduced by about 94%.

In addition, for the $H_2$ (5%)/$CHCl_3$/$H_2$ (5%)/$CHCl_3$-treated CNTs that were subjected to the purification process of Example 2, the total concentration was 448 ppm, indicating that the metallic impurities were reduced by 97% as compared with raw CNTs. As a result, compared to the $CHCl_3$-treated CNTs, the effect of further reducing the concentration is exhibited.

Example 3

0.5 g of MWCNTs B was added to a quartz glass tube (a length of 65 cm and a diameter of 3 cm), the quartz glass tube was fixed in a vertical furnace, and then the furnace was increased to a purification temperature under a nitrogen atmosphere.

When the temperature of the furnace reached the purification temperature, the nitrogen gas was passed through liquid chloroform (anhydrous, Aldrich), and played a role in delivering the chloroform in a type of gas to the furnace fixed with the MWCNT B.

At this time, the nitrogen was passed through chloroform at a flow rate of 100 ml/min, and injected for 1 hour.

The chloroform was subjected to thermal decomposition in a high-temperature reactor, and then the metallic impurities included in the CNTs were removed using the HCl gas, Cl radicals and H radicals generated through the thermal decomposition reaction.

After completing the purification process, the furnace was again cooled to room temperature under a nitrogen atmosphere to obtain the purified CNTs ($CHCl_3$, treated sample).

Meanwhile, the unreacted chloroform and the by-products from the purification reaction were collected in a liquid or solid form using a cold trap, and the HCl gas that was one of the products was collected through a trap including a 1M aqueous NaOH solution.

Example 4

0.5 g of MWCNTs B was added to a quartz glass tube, the quartz glass tube was fixed in a vertical furnace, and then the furnace was heated up from room temperature to a purification temperature under a nitrogen atmosphere. When the temperature of the furnace reached the purification temperature, liquid carbon tetrachloride (anhydrous, Aldrich) was bubbled with nitrogen and then injected.

At this time, the nitrogen was passed through carbon tetrachloride at a flow rate of 100 ml/min, and then injected for 1 hour.

The carbon tetrachloride was subjected to the thermal decomposition in the reactor, and then the Cl radicals generated during the thermal decomposition process were reacted with the metallic impurities included in the CNTs to purify the CNTs.

After completing the purification process, the nitrogen was again flowed through the furnace to cool the temperature of the furnace to room temperature, thereby obtaining the purified CNTs ($CCl_4$-treated sample).

Meanwhile, the unreacted product and the by-products generated during the purification reaction were collected using a cold trap, and the HCl gas that was one of the products was collected through a trap including a 1M aqueous NaOH solution.

Figure 4:
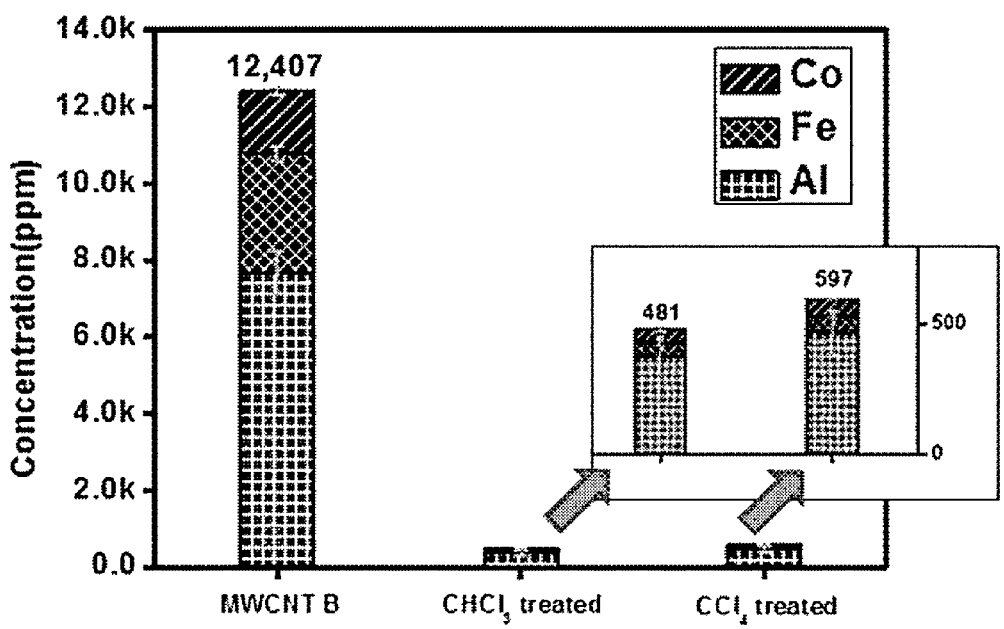
FIG. 4 is a graph illustrating the concentrations of metallic impurities in the CNTs after performing the purification steps of Examples 3 and 4.

FIG. 4 is a graph illustrating the concentrations of metallic impurities in the CNTs after performing the purification steps of Examples 3 and 4. At this time, the analysis of the impurity concentration was performed through ICP-AES.

Referring to FIG. 4, for the raw MWCNTs B that was not subjected to the purification method, the total concentration (Al+Fe+Co) of the metallic impurities was 12,407 ppm.

In addition, for the $CHCl_3$-treated CNTs that were subjected to the purification method of Example 3, the total concentration of metallic impurities was 481 ppm, indicating that the metallic impurities were reduced by about 96%.

In addition, for the $CCl_4$-treated CNTs that were subjected to the purification process of Example 4, the total concentration of metallic impurities was 597 ppm, indicating that the metallic impurities were reduced by 95% compared to the raw CNTs.

Therefore, it can be confirmed that the metallic impurities in the $CHCl_3$-treated CNTs were further reduced compared to the $CCl_4$-treated CNTs.

Figure 5:
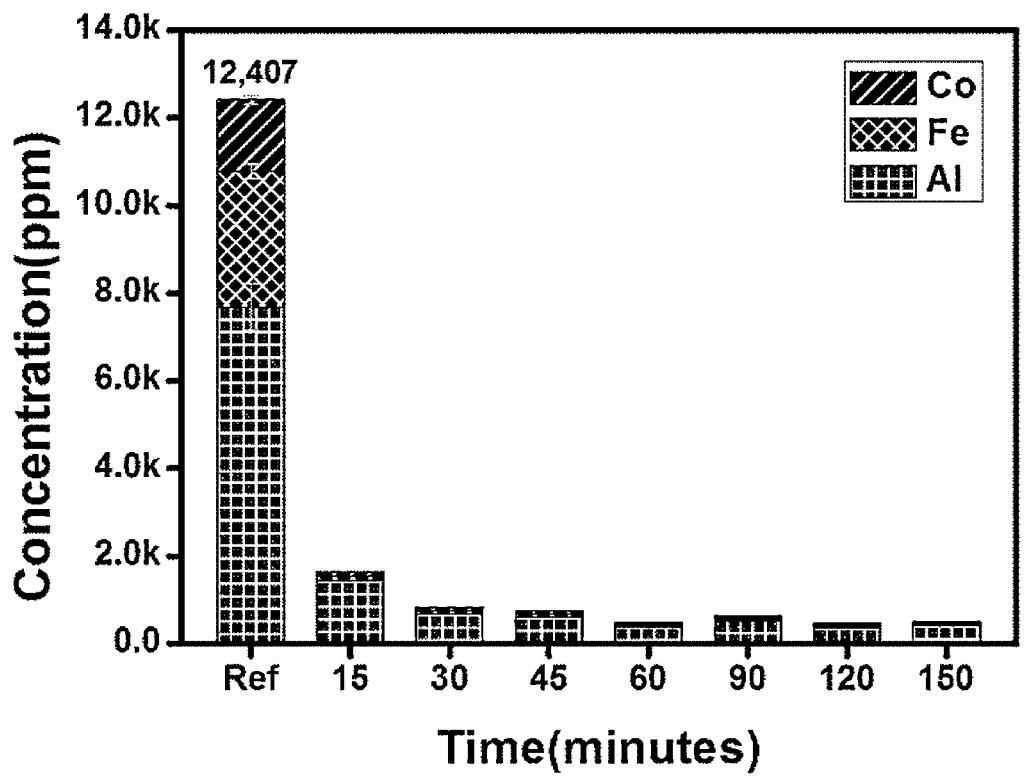
FIG. 5 is a graph illustrating the amounts of metallic impurities decreased in the CNTs according to the purification times when the purification step of Example 3 is performed.

FIG. 5 is a graph illustrating the amounts of metallic impurities decreased in the CNTs according to a period of time of purification when the purification step of Example 3 was performed. At this time, the analysis of impurity concentration was performed through ICP-AES.

Referring to FIG. 5, it can be confirmed that the impurities were sufficiently reduced in a purification time of 30 minutes after chloroform was passed through the CNTs.

In addition, it can be confirmed that the largest purification effect was shown in a purification time of 15 minutes to 2 hours, more preferably, 30 minutes to 1 hour.

Example 5

The same purification method as in Example 3 was performed, except that the CNTs were purified by passing chloroform through the heated MWCNTs B, and then the halogen was further removed before cooling the purified CNTs. At this time, the halogen was Cl.

As the step of removing the halogen, ① a nitrogen treatment ($N_2$), ② an ethanol treatment (EtOH), ③ an oxygen treatment ($O_2$), and ④ a hydrogen treatment ($H_2$) were performed.

For the nitrogen treatment ($N_2$), $N_2$ was passed through the purified CNTs at the same purification temperature (about 800° C.) for 3 hours after purifying the CNTs using chloroform to remove the remaining Cl from the CNTs.

For the ethanol treatment (EtOH), ethanol bubbled with $N_2$ was passed through the purified CNTs at the same purification temperature (about 800° C.) for 3 hours after purifying the CNTs using chloroform to remove the remaining Cl from the CNTs.

For the oxygen treatment ($O_2$), the mixed gas of 99% $N_2$ and 1% $O_2$ was passed through the purified CNTs at the same purification temperature (about 800° C.) for 3 hours after purifying the CNTs using chloroform to remove the remaining Cl from the CNTs.

The EDX results measured after removing the halogen through the treatments with the various types of gases from the MWCNT sample (JC-120) that was subjected to the chloroform purification process are listed in the following Table 1.

TABLE 1

| Sample | JC-120 (wt %) | | | | | | |
|---|---|---|---|---|---|---|---|
| | C | O | Cl | Al | Fe | Co | Total |
| As-received | 91.72 | 7.05 | — | 0.59 | 0.44 | 0.20 | 100 |
| $CHCl_3(N_2)$ 1 h | 91.77 | 2.78 | 5.45 | — | — | — | 100 |
| $CHCl_3$—$N_2$ 3 h | 95.52 | 3.45 | 1.03 | — | — | — | 100 |
| $CHCl_3$—EtOH 3 h | 96.45 | 5.94 | 0.08 | — | — | — | 100 |
| $CHCl_3$—$O_2$ 3 h | 93.89 | 5.88 | 0.23 | — | — | — | 100 |
| $CHCl_3$—$H_2$ 3 h | 96.22 | 3.57 | 0.21 | — | — | — | 100 |

Referring to Table 1, the MWCNTs include Al, Fe, and Co before being purified (as-received).

After being subjected to the chloroform purification process using a $N_2$ carrier gas for 1 hour ($CHCl_3(N_2)$ 1 h), it was confirmed from the EDX analysis results of the MWCNTs that Al, Fe, and Co included in the as-received sample were completely removed and about 5.5 wt % of Cl was functionalized. The chlorine generated from the chloroform decomposition process was considered to have reacted with a C=C bond at a MWCNT tip end and external wall, and then functionalized. In addition, it can be confirmed that oxygen (O) was reduced after the purification, which indicates that the $Al_2O_3$ used as a catalyst support during the synthesis of MWCNT was removed during the reaction.

The post treatment was performed with $N_2$, $O_2$, EtOH, and $H_2$ such that the remaining Cl after the chloroform purification was removed. $N_2$ treatment was performed for 3 hours ($CHCl_3$—$N_2$ 3 h), and then $N_2$ was simply flowed at 800° C. to reduce Cl. From this result, it can be confirmed that about 80% Cl can be removed only by the heat treatment effect.

When the ethanol was bubbled with nitrogen and then injected through the CNTs for 3 hours ($CHCl_3$-EtOH 3 h), Cl functional groups almost completely disappeared at the surface and the content of oxygen was relatively increased.

In addition, for the 1% $O_2$ treatment for 3 hours ($CHCl_3$—$O_2$ 3 h) and $H_2$ treatment for 3 hours ($CHCl_3$—$H_2$ 3 h), it can be confirmed that the Cl functional groups were effectively removed.

Figure 6:
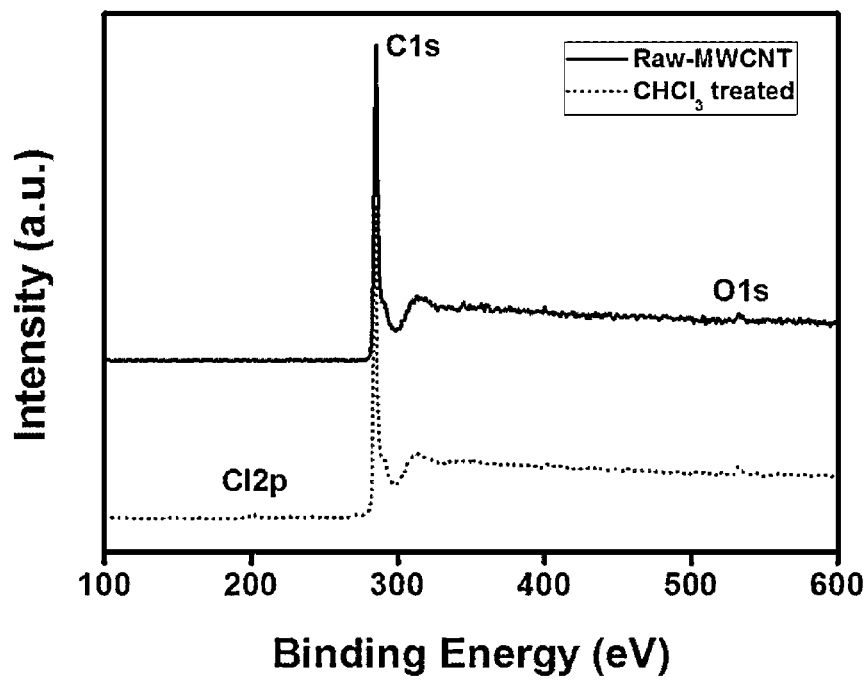
FIG. 6 is an XPS graph of MWCNTs before and after performing the purification with chloroform.

FIG. 6 is an XPS graph of MWCNTs before and after performing the purification with chloroform.

Figure 7:
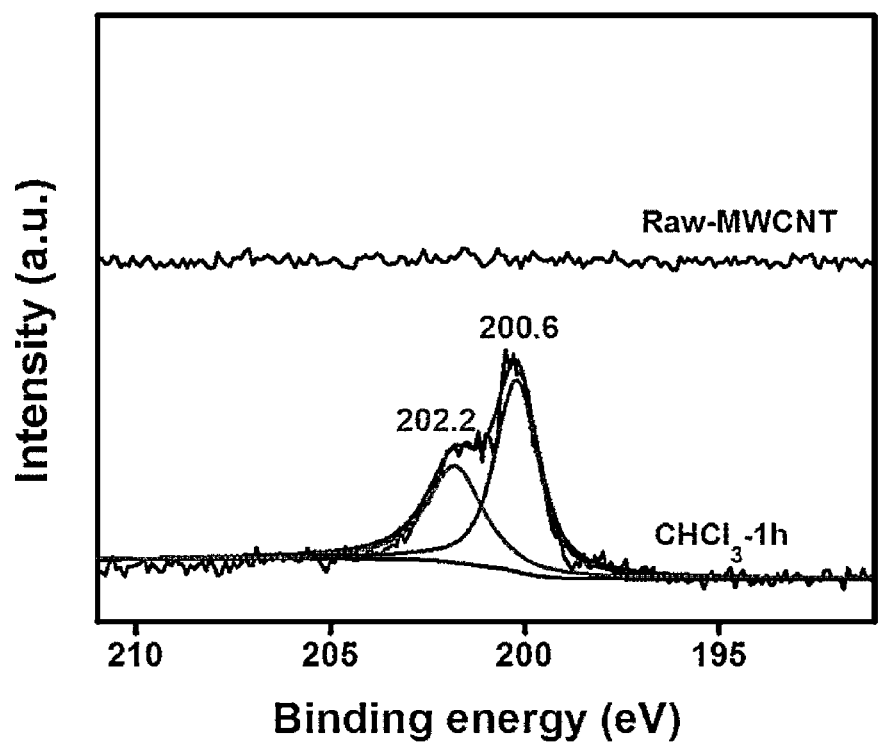
FIG. 7 is a high resolution XPS graph of Cl 2p of MWCNTs after performing the purification with chloroform.

Referring to FIG. 6, the survey scans of the as-received raw MWCNTs and the MWCNTs purified with chloroform at 800° C. for 1 hour ($CHCl_3$ treated) are shown, and as illustrated in FIG. 7, the Cl was functionalized after the chloroform treatment to exhibit a Cl 2p peak, and here, a very small amount of Cl within less than 1.0 at % was functionalized.

FIG. 7 is a high resolution XPS graph of Cl 2p of MWCNTs after performing the purification with chloroform.

FIG. 7 illustrates the XPS Cl 2p peak of the as-received MWCNTs (JC-120) and the MWCNTs purified with chloroform at 800° C. for 1 hour ($CHCl_3$-1 h). Referring to FIG. 7, it can be confirmed that, for the chloroform treatment sample, a spin-orbit division was exhibited in the levels of 3/2 and 1/2. The peaks were exhibited at 200.8 eV and 202.2 eV, indicating that a C—Cl(Ph-Cl) bond was formed. For the $CHCl_3$-1 h, about 1.0 at % of Cl was included.

In other words, it could be confirmed that, the peak was exhibited in the range of 195 eV to 212 eV only for the $CHCl_3$-1 h. Finally, it could be confirmed that when the step of removing halogen was not performed after treating the CNTs with chloroform, the Cl remained on the surface of CNTs.

Figure 8:
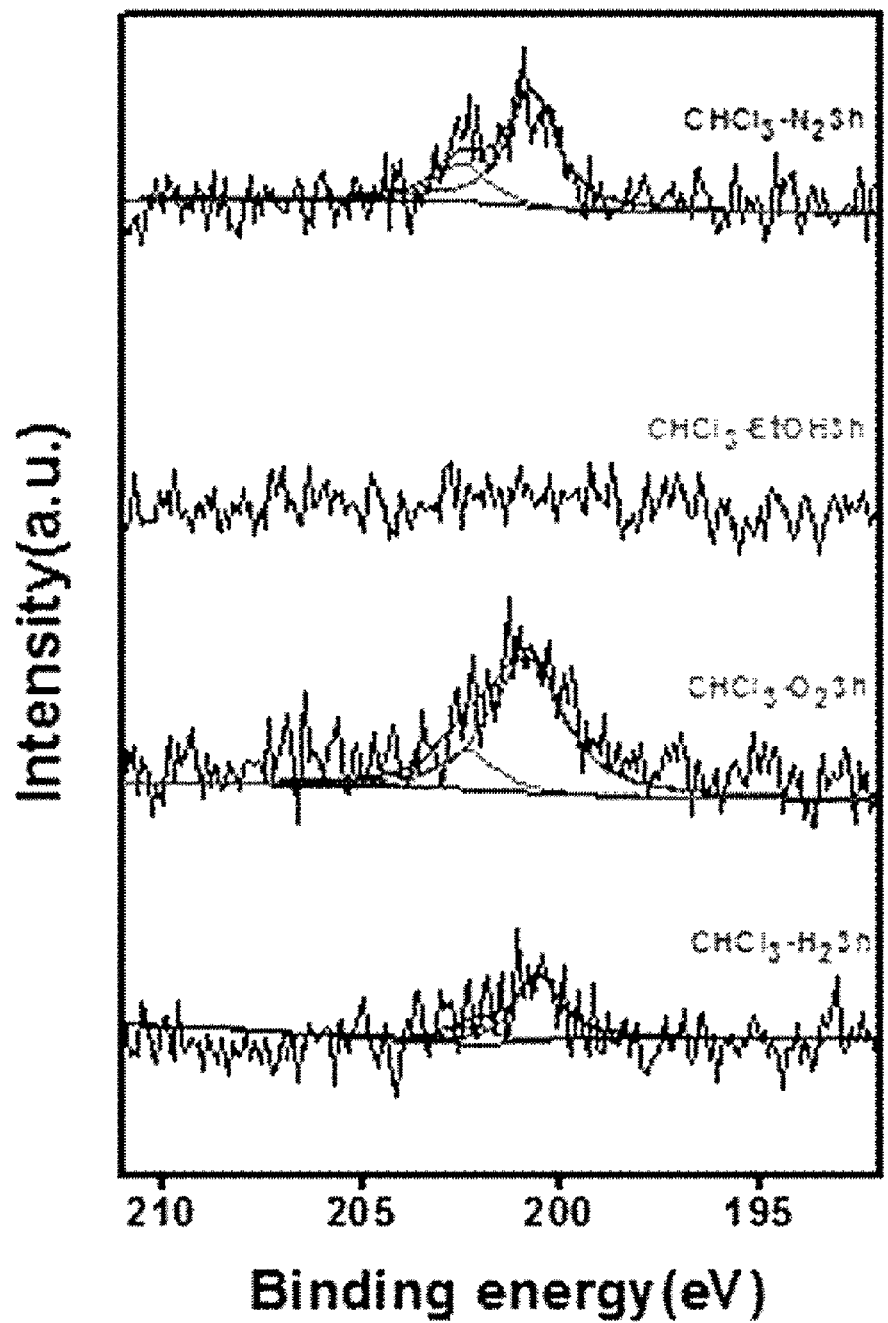
FIG. 8 is an XPS graph of MWCNTs that are subjected to a post process for removing a Cl functional group which has been introduced by performing the purification with chloroform.

FIG. 8 is an XPS graph of MWCNTs that were subjected to a post process for removing a Cl functional group after performing the purification with chloroform.

FIG. 8 illustrates the Cl 2p peak of the sample that was subjected to a nitrogen treatment ($CHCl_3$—$N_2$ 3 h), an ethanol treatment ($CHCl_3$-EtOH 3 h), an oxygen (1%) treatment ($CHCl_3$—$O_2$ 3 h), and a hydrogen (5%) treatment ($CHCl_3$—$H_2$ 3 h) each for 3 hours, after purifying with chloroform for 1 hour.

As illustrated in FIG. 8, it could be confirmed that the functionalized Cl was mostly removed through the nitrogen or oxygen treatment, and especially, when treatment with ethanol was performed, there was no Cl on XPS, indicating that ethanol was effective in removing the functionalized Cl. When ethanol treatment was performed, a thin carbon layer including oxygen seemed to be coated over the surface of CNTs from the thermal decomposition of ethanol, the Cl functional groups were buried underneath the surface and completely disappeared at the surface of CNTs, and the content of oxygen was relatively increased, indicating a similar trend to the EDX result.

Therefore, when the step of removing Cl, such as a nitrogen treatment ($N_2$), an ethanol treatment (EtOH), an oxygen treatment ($O_2$), and a hydrogen treatment ($H_2$) was performed, it could be confirmed that the Cl remaining on the CNTs was removed through the purification step.

Example 6

Referring to FIG. 1, the process of purifying the CNTs, which includes heating the CNTs (S100), passing liquid chloroform ($CHCl_3$) through the CNTs using a carrier gas (S200), removing a halogen (S300), cooling the CNTs (S400), and treating the CNTs with an acid (S500), was performed.

0.5 g of CNTs (JC142-P1) was added to a quartz glass tube, the quartz glass tube was fixed in a vertical furnace, and then the furnace was heated up from room temperature to a purification temperature under a nitrogen atmosphere. When the temperature of the furnace reached the purification temperature, the nitrogen gas was passed through liquid chloroform, and served to deliver chloroform as a gas.

At this time, when the chloroform was bubbled at a flow rate of 100 ml/min by nitrogen, the chloroform was injected to the CNTs at a flow rate of 0.16 ml/min along with nitrogen as a carrier gas.

Next, the Cl introduced after the chloroform gas-phase purification was removed. At this time, the halogen was removed using the mixed gas of $N_2$ (95%) and $H_2$ (5%). When $H_2$ treatment was performed, $H_2$ was passed through the CNTs that were subjected to the chloroform gas-phase purification at the same temperature as the chloroform gas-phase purification temperature (800° C.) to remove the Cl remaining in the CNTs.

After removing the halogen, the step of cooling the CNTs was performed and then the purification step of acid treatment was performed. 0.2 g of the CNTs that were subjected to the step of removing the halogen (H₂ (5%) treated) and 50 ml of 3 M hydrochloric acid were added to a 250 ml container and then stirred at room temperature for 3 hours.

Figure 9:
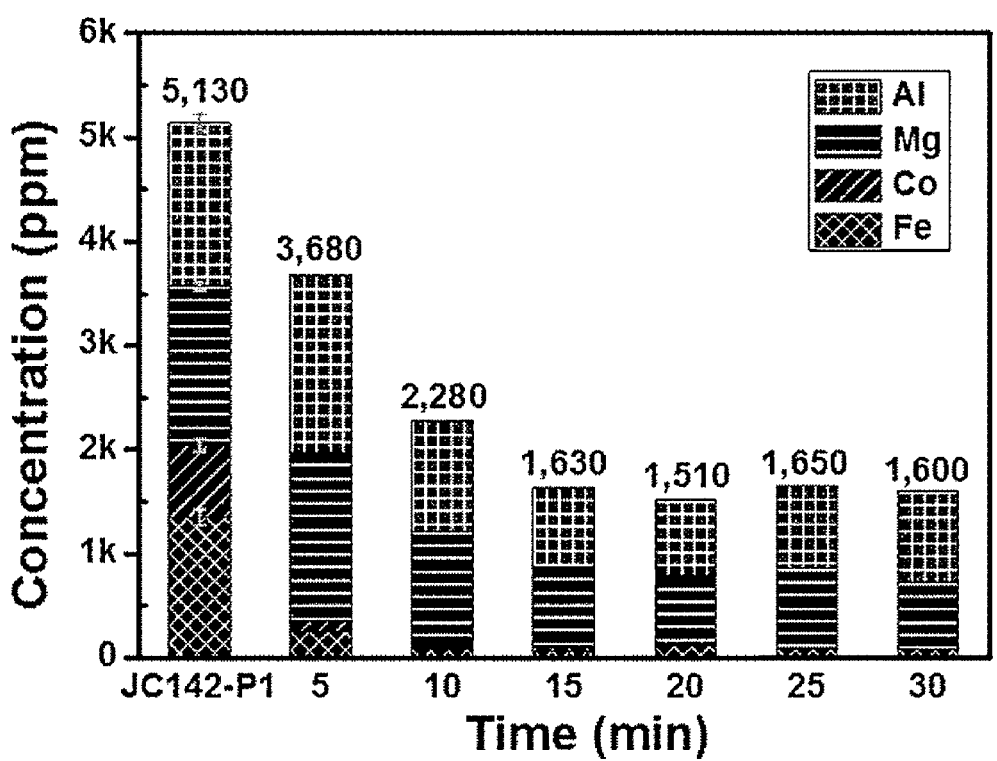
FIG. 9 is a graph illustrating the concentration change of metallic impurities in the CNTs according to the purification times when the purification step of Example 6 is performed.

FIG. 9 is a graph illustrating the concentration change of metallic impurities in the CNTs according to a period of time of purification when the purification step of Example 6 was performed.

Referring to FIG. 9, the impurities monotonically decreased in amount with a longer period of time to 15 minutes, but the concentration of the impurities was not further reduced over 15 minutes and was rather maintained to be quite constant over a certain amount. Even if the MWCNTs (JC142-P1) were purified with chloroform for 15 minutes or more, $Al_2O_3$ and MgO that were metallic oxide impurities were not removed but remained.

Figure 10:
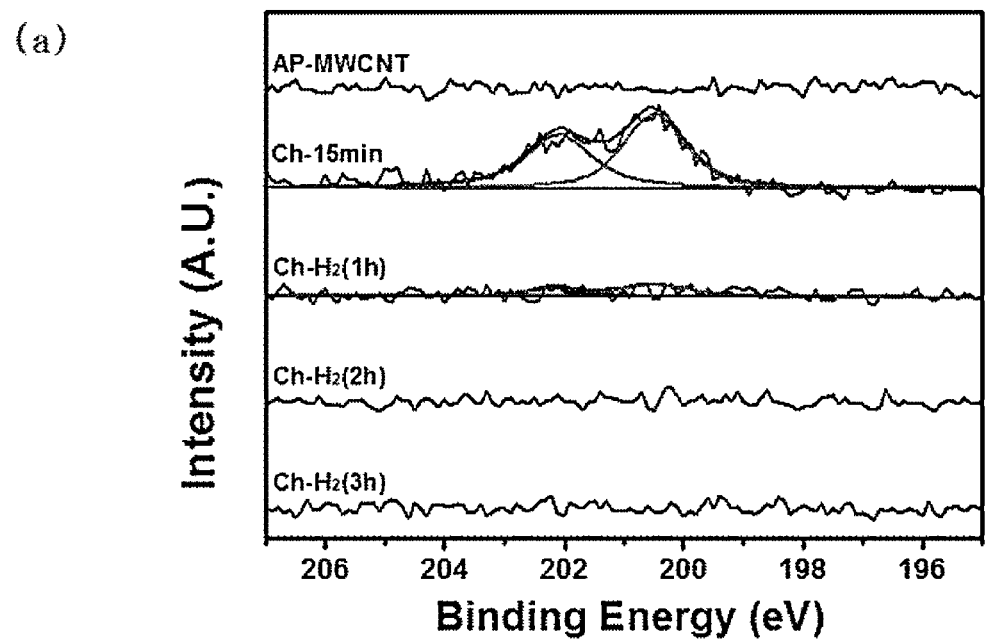
FIG. 10 is a graph (a) illustrating a Cl 2p peak measured with XPS and a table (b) listing the contents of compositions after performing the step of performing the gas-phase purification with chloroform and the step of removing a halogen in Example 6.

FIG. 10 is a graph (a) illustrating a Cl 2p peak measured with XPS and a table (b) listing the contents of compositions after the step of performing the gas-phase purification with chloroform and the step of removing the halogen in Example 6.

In FIG. 10, there was no Cl for the CNTs (JC 142-P1) before being purified. However, 0.62 at % of Cl was introduced into the CNTs by performing the chloroform gas-phase purification for 15 min (Ch-15 min). The CNTs that were subjected to the chloroform purification were treated with H₂ (5%) gas for 1 hour (Ch-H₂ (1 h)), thereby decreasing the content of Cl to 0.19 at %. When the H₂ (5%) gas treatment was performed for 2 hours (Ch-H₂ (2 h)) and 3 hours (Ch-H₂ (3 h)), Cl was not detected at all.

Figure 11:
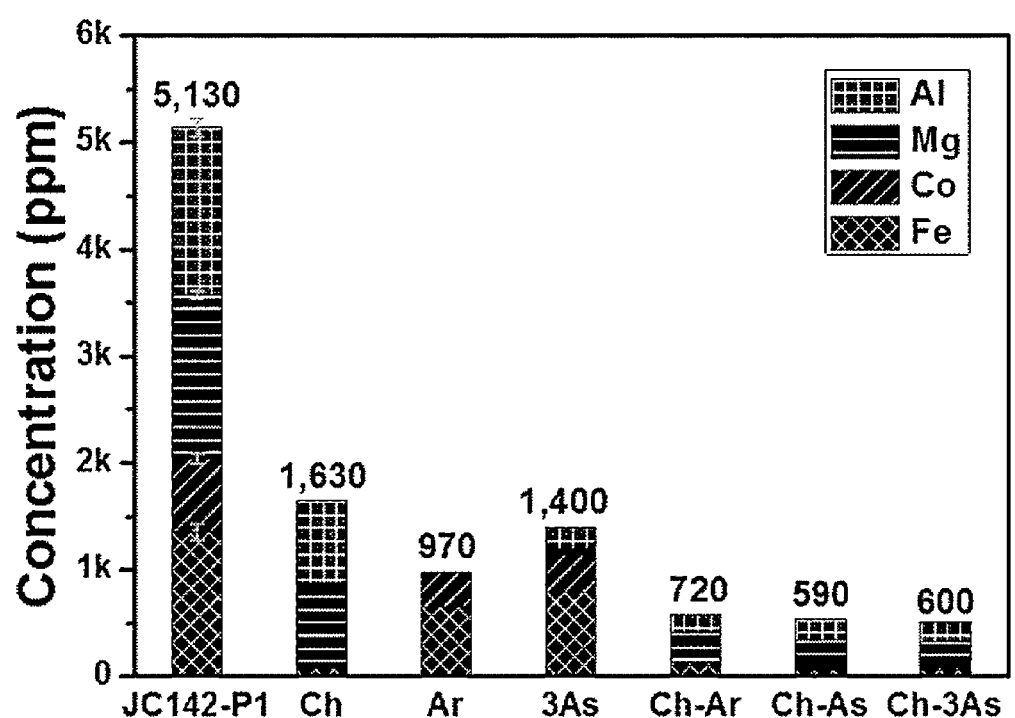
FIG. 11 is a graph illustrating the concentration change of metallic impurities included in the CNTs after performing the acid-treating purification step in Example 6.

FIG. 11 is a graph illustrating the concentration change of metallic impurities included in the CNTs after performing the acid-treating purification step in Example 6.

As illustrated in FIG. 11, it could be confirmed that the metallic impurities in the CNTs (JC 142-P1) before being purified amounted to 5,130 ppm, and when the CNTs were subjected to the gas-phase purification with chloroform at 800° C. for 15 minutes, the metallic impurities in the CNTs (Ch) were reduced to 1,630 ppm. After performing the chloroform gas-phase purification, Fe and Co were almost completely removed, but large amounts of Al and Mg remained. Meanwhile, the CNTs (Ar, 3As) that were purified only with 11 M and 3 M hydrochloric acid without performing the chloroform gas-phase purification process exhibited metallic impurity concentrations of 970 ppm and 1,400 ppm, respectively. After performing the acid-treated purification, Al and Mg were completely removed, but large amounts of Fe and Co remained.

Referring to FIG. 11, it could be confirmed that when the different acid-treating conditions (Ch—Ar, Ch—As, and Ch-3As) were used after the chloroform gas-phase purification step, the concentration change of the metallic impurities in the CNTs was exhibited. According to the result of purifying the CNTs with an acid after the chloroform gas-phase purification, the concentrations of the metallic impurities for Ch—Ar, Ch—As, and Ch-3As were 720 ppm, 590 ppm, and 600 ppm, respectively. After the chloroform gas-phase purification (Ch), Fe and Co were mostly removed. Although the three different acid purification conditions (reflux of 11 M hydrochloric acid, stirring of 11 M hydrochloric acid at room temperature, and stirring of 3M hydrochloric acid at room temperature) were applied to the CNTs that was subjected to the chloroform gas-phase purification process, there were no significant differences among the concentration results of metallic impurities. This means that the halogen should be removed before the acid-treated purification step due to the influence of Cl remaining after the chloroform gas-phase purification step.

Figure 12:
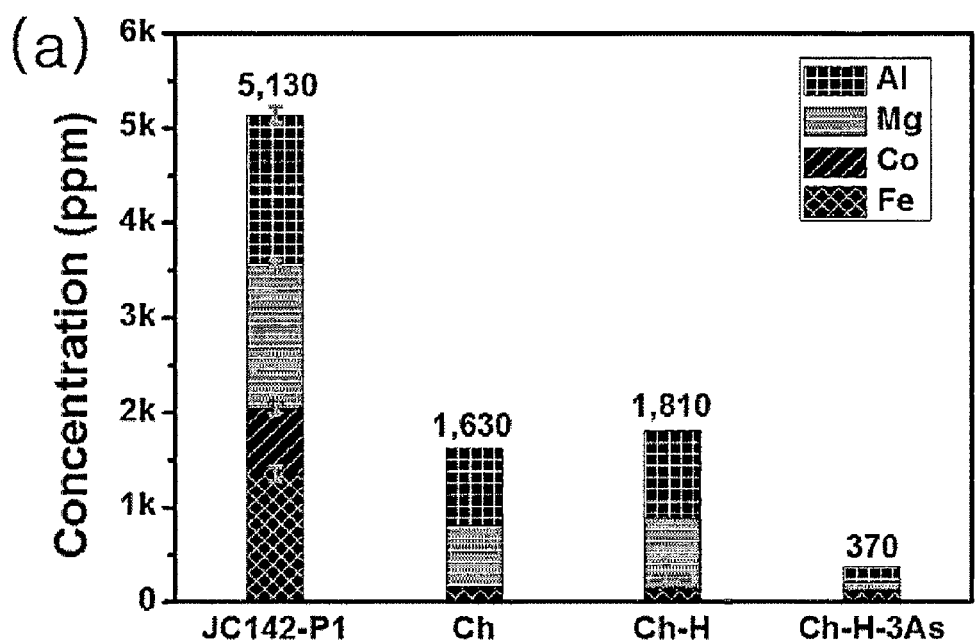
FIG. 12 is a graph (a) illustrating the concentration changes of metallic impurities and a table (b) listing the contents of compositions in the CNTs after performing the chloroform gas-phase purification step, the halogen-removing step, and the acid-treating purification step of Example 6.

FIG. 12 is a graph (a) illustrating the concentration changes of metallic impurities and a table (b) listing the contents of compositions in the CNTs after performing the chloroform gas-phase purification step, the halogen-removing step, and the acid-treated purification step of Example 6.

As illustrated in FIG. 12, the concentration of metallic impurities in the CNTs (JC 142-P1) before being purified was 5,130 ppm, but the concentration of metallic impurities in the CNTs (Ch) that were subjected to the chloroform gas-phase purification for 15 minutes was reduced to 1,630 ppm. When the CNTs that were subjected to the chloroform gas-phase purification were treated with H₂ (5%) gas for 15 minutes to remove the halogen, the metallic impurities were not reduced. The concentration of metallic impurities in the CNTs (Ch-H-3As) that were purified in 3M hydrochloric acid while being stirred at room temperature was further reduced, that is, was 370 ppm.

From the result illustrated in FIG. 12, it could be confirmed that, for the step of removing the halogen between the chloroform gas-phase purification step and acid-treatment purification step, the concentration of metallic impurities in the CNTs treated with hydrogen (5%) (Ch-H-3As) and the concentration of metallic impurities in the CNTs that were not hydrogen-treated (Ch-3As as illustrated in FIG. 11) were 370 ppm and 600 ppm, respectively. Therefore, when the hydrogen-treating step of removing the halogen was included, the effect of decreasing the metallic impurities was great. When the step of removing the halogen was included after the chloroform gas-phase purification step, the chlorine functional groups generated during the chloroform purification process were completely removed through etching, and thus the metallic impurities were further reduced through the acid-treatment purification step.

Therefore, Al and Mg, which were difficult to completely remove only through the chloroform gas-phase purification step, could be removed through the chloroform gas-phase purification step, the step of removing the halogen, and the acid-treatment purification step. Therefore, the metallic impurities included in the CNTs were completely removed, and thus an effective purification method that can obtain high-purity CNTs was provided.

Therefore, according to embodiments of the present invention, the method of purifying CNTs that can effectively remove metallic impurities in a short time through a simple one-step purification step by simply passing a liquid halide through CNTs using a carrier gas can be provided.

Furthermore, using chloroform as the halide, it is possible to provide the safe and environmentally friendly method of purifying CNTs through which metallic impurities can be more effectively removed.

In addition, when chloroform that is commonly used as an organic solvent is used in the purification method rather than carbon tetrachloride, the production of which is regulated, H radicals and HCl gas are directly involved in the metallic-impurity-removing reaction, and thus it is possible to more effectively remove Al.

In addition, by passing a reducing gas that reduces metallic oxide impurities through the CNTs before the purification step using the liquid halide, the metallic oxide impurities are removed along with the metallic impurities, and thus the method for purifying CNTs that can improve a purification effect can be provided.

In addition, by further including the step of removing a halogen substance, such as Cl, remaining in the CNTs during the purification step, problems such as metal corrosion due to the remaining halogen substance can be prevented in advance.

In addition, by further performing the acid-treatment purification step after the chloroform gas-phase purification of CNTs, the metallic oxide impurities such as $Al_2O_3$ and MgO can be further removed, and thus the purification effect can be improved.

According to embodiments of the present invention, by simply passing a liquid halide through CNTs using a carrier gas, a method for purifying CNTs can be provided so as to effectively remove metallic impurities from the CNTs in a purification time of 15 minutes to 2 hours, more preferably 30 minutes to 1 hour, in a one-step.

Furthermore, by using chloroform that is an organic solvent as the halide, a relatively safe and environmentally friendly method for purifying CNTs that can remove metallic impurities more effectively than a typical purification method using a $Cl_2$ gas or a strong acid can be provided.

In addition, by passing a reducing gas that reduces metallic oxide impurities through CNTs before the purification step using a liquid halide, a method for purifying CNTs that can remove metallic impurities and also metallic oxide impurities during the purification step, thereby more improving the purification effect, can be provided.

In addition, by further performing the step of treating the CNTs with an acid after the chloroform treatment, the metallic impurities, such as Co and Fe, and metallic oxide impurities, such as $Al_2O_3$ and MgO, can be further removed, and thereby the purification effect can be more improved.

The technical effects of the present invention are not limited to the above-described effects, and other technical effects that are not described are clearly understood by a person who skilled in the art with reference to the above descriptions.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A method of treating carbon nanotubes (CNTs) for removing impurities, the method comprising:
    heating CNTs including metallic impurities;
    passing a halide-containing gas through the CNTs to halogenate at least part of the metallic impurities; and
    subsequently, etching surfaces of the CNTs to remove at least part of halogen remaining on the surfaces of the CNTs.

2. The method of claim 1, wherein the metallic impurities include one or more selected from the group consisting of Fe, Co, Ni, and Al.

3. The method of claim 1, wherein the halide-containing gas includes chloroform.

4. The method of claim 1, wherein the halide-containing gas comprises a carrier gas including at least one of $N_2$ and Ar.

5. The method of claim 1, wherein heating the CNTs is performed to a temperature of 650° C. to 800° C.

6. The method of claim 1, wherein etching surfaces of the CNTs is performed by one or more selected from the group consisting of a nitrogen treatment, an oxygen treatment, a hydrogen treatment, and a water moisture treatment.

7. The method of claim 1, further comprising:
    subsequent to etching, cooling the CNTs; and
    treating the CNTs with an acid.

8. The method of claim 7, wherein the acid comprises hydrochloric acid.

9. The method of claim 7, wherein treating the CNTs with an acid is performed at room temperature.

10. The method of claim 1, wherein the CNTs further comprise metallic oxide impurities, wherein the method further comprises:
    between heating and passing the halide-containing gas, passing a reducing gas through the CNTs to reduce at least part of the metallic oxide impurities.

11. The method of claim 10, wherein the metallic oxide impurities include at least one of $Al_2O_3$ and MgO.

12. The method of claim 10, wherein the reducing gas includes $H_2$.

13. The method of claim 10, wherein passing a reducing gas and passing a halide-containing gas are repeatedly performed more than one time.

14. A method of treating carbon nanotubes (CNTs) for removing impurities, the method comprising:
    heating CNTs including metallic impurities;
    passing a halide-containing gas through the CNTs to halogenate at least part of the metallic impurities in the CNTs; and
    subsequently, coating surfaces of the CNTs with a carbon substance to cover at least part of halogen remaining on the surfaces of the CNTs.

15. The method of claim 14, wherein coating comprises applying a hydrocarbon gas to the CNTs and then thermally decomposing the hydrocarbon gas to deposit the carbon substance over at least part of halogen remaining on surfaces of the CNTs.

16. The method of claim 15, wherein applying the hydrocarbon gas comprises bubbling an organic solvent including carbon and hydrogen with a carrier gas, and then directing the bubbled organic solvent to the CNTs.

17. The method of claim 14, wherein the CNTs further comprise metallic oxide impurities, wherein the method further comprises:
    between heating and passing the halide-containing gas, passing a reducing gas through the CNTs to reduce at least part of the metallic oxide impurities.

18. The method of claim 17, wherein passing a reducing gas and passing a halide-containing gas are repeatedly performed more than one time.

19. A method of treating carbon nanotubes (CNTs) for removing impurities, the method comprising:
    heating CNTs including metallic impurities;
    passing chloroform-containing gas through the CNTs to chlorinate at least part of the metallic impurities contained in the CNTs; and
    subsequently, applying an etching gas or a hydrocarbon deposition gas onto surfaces of the CNTs to remove at least part of chlorine remaining on the surfaces of the CNTs or to deposit a carbon substance over at least part of chlorine remaining on the surfaces of the CNTs.

20. The method of claim 19, wherein the metallic impurities include one or more selected from the group consisting of Fe, Co, Ni, and Al.

21. The method of claim 19, further comprising:
    cooling the CNTs; and
    treating the CNTs with an acid after cooling the CNTs.

22. The method of claim 19, wherein the CNTs further comprise metallic oxide impurities, wherein the method, further comprises:

between heating and passing the chloroform-containing gas, passing a reducing gas through the CNTs to reduce at least part of the metallic oxide impurities.

\* \* \* \* \*